Jan. 2, 1968  H. BEHRENS  3,360,828
APPARATUS FOR APPLYING PACKINGS TO PIPES
Filed Sept. 16, 1965  3 Sheets-Sheet 1

INVENTOR.
HEINZ BEHRENS
BY Fraser & Fraser
ATTORNEYS

United States Patent Office 3,360,828
Patented Jan. 2, 1968

3,360,828
APPARATUS FOR APPLYING PACKINGS
TO PIPES
Heinz Behrens, 19 am Weidenpesch, 5022 Junkersdorf,
near Cologne, Germany
Filed Sept. 16, 1965, Ser. No. 487,814
Claims priority, application Germany, Oct. 10, 1964,
Sch 35,937
4 Claims. (Cl. 18—26)

ABSTRACT OF THE DISCLOSURE

The specification describes an installation for applying plastic packings to the ends of bell and spigot pipes. Molds are clamped against the ends of the pipes so as to leave annular spaces for the packings to be formed inside the bells and on the outside of the spigots, a clamping pressure being applied by means outside the pipes. The pipes are carried on frames which travel horizontally on a conveyor.

---

This invention relates to means for the production of plastic for the bell- and/or spigot-end of bell and spigot pipes.

Heretofore, in laying bell and spigot pipes of the ceramic type, and especially sewer pipes, the pipes were usually sealed against each other by inserting tar soaked cords or similar packing material into the ring-shaped space between the spigot end of one pipe and the bell end of the other pipe. It has been more and more customary in recent years to apply instead of such a packing prefabricated packings into the bell and onto the spigot end of the ceramic pipes, so that the pipes have only to be fitted together on the job during laying.

Plastic materials, such as polyester resins or polyurethanes, can be mixed with a filler, such as quartzdust, for cost reduction, and have proved particularly well suited for such packings. In the production and application of such packings, use is made of the fact that these artificial resins can be cast in the plastic state and that they harden within a reasonable time after casting.

The manufacture of such plastic packings is relatively expensive, because in the first place the plastic material itself is expensive and in the second place relatively complicated methods have to be employed in the production of the packings. In fact, the cost of such packings is almost as high as the price of the ceramic pipes themselves.

In order to maintain the price of such packings at a low level, the use of expensive plastic in conjunction with a low-priced filler has been tried and secondly the production of the packings themselves as far as possible has been achieved by proceeding in the manner decribed hereunder.

The previously fired ceramic bell and spigot pipes are placed on a frame by a fork-lift truck from which they may be taken by a vacuum suction gripper, for example, and hung onto a conveyor chain so that the bell ends of the pipes point upwardly. The pipes hang in forks which in turn are fastened to a revolving conveyor chain so that each perpendicularly hanging pipe can rotate about its vertical axis. The pipes are generally transported continuously along by the chain conveyor. After having traveled a short distance a metal mold is inserted by an operator into the upper bell, which should make possible the casting of the artificial resin later on. After applying the mold to the pipe, a chain is dropped through the inside of the pipe, and the chain is of such length that it projects a certain length downward beyond the spigot end. Then from below a second metallic mold is fitted around the spigot end of the pipe, and this mold is provided in its center with an opening and a slot through which the chain is passed. The lower mold is now drawn against the spigot end of the pipe by the chain. This lower metallic mold serves the purpose of applying the packing to the spigot end of the pipe during the ensuing work process. The lower and the upper molds must be tensioned so tightly that on casting the plastic material into the mold no packing material will reach any part of the pipe below the spigot end. In the case of the bell end, no packing material should enter the shoulder of the bell or the inside of the pipe. From this it is apparent that in fitting the molds not only is a complicated work process required but also heavy manual labor in order to be certain that adequate mold to pipe pressure is achieved.

During the continued advancing movement of the pipes along the chain track, they reach a position where the artificial resin is injected into the molds by means of injection nozzles. During the injection process the pipes are rotated by hand so that the injection of the plastic takes place evenly around the periphery. After introduction of the plastic the pipes are advanced further and remain about fifteen to thirty minutes on the conveyor until the plastic or artificial resin has hardened sufficiently.

The pipe ends are then cleaned to remove the superfluous plastic, which necessarily occurs during the injection cycle. Incidental spray stains and other impurities are manually removed.

The molds are then removed from the ends of the pipe and the pipes are advanced by the conveyor until they reach a position where they are removed by means of appropriate equipment and delivered to a storage place. The molds which have been removed from the pipes must be carried back over a special path to the place where they can again be applied to other pipes. At this time the cleaning of the molds is carried out.

The apparatus according to this invention achieves an essential simplification of the work process and facilitates the work of the operators, and the actual production of the packings may be performed by semi-skilled labor.

The invention thus provides an apparatus for the production of plastic packings at the bell- and/or spigot-end of bell and spigot pipes, by continuously conveying revolving pipes past one work station for the injection of the artificial resin into the space between bell or spigot end and an attached mold, and past a work station for the hardening or curing of the plastic material. This is characterized by molds forming clamping devices for clamping the pipes therebetweeen and revolving continuously during the advancing movement.

With such apparatus it is possible to achieve the necessary pressure against the pipes in a simple manner, while also mechanical equipment, for instance equipment actuated by compressed air, magnetic equipment or equipment utilizing hydraulic fluids can be employed in place or manual labor.

An essential advantage of the apparatus according to this invention resides in the fact that the molds are permanently attached to the conveyor and it is therefore unnecessary to expend special work for the removal, transportation and re-attachment of the molds.

According to the invention especially advantageous clamping devices can be used and these may be placed in a frame attached to the conveyor and each frame carries one clamping device directly, while the other clamping device is attached through a lever device to the frame.

It is advantageous that the clamping device be attached to the frame in such a manner that it can rotate around an axis coincident with the central pipe axis when in its clamping position.

This method of attachment enables the necessary rotary motion of the pipe when the artificial resin is introduced into the molds, by having the peripheral surface of the lower and/or upper mold roll along a friction track, whereby the rotary motion of the pipe is automatically produced by its own forward motion.

It is advantageous to guide the frame with its end which is fastened to the conveyor.

A further advantage of such a construction lies in the fact that the cleaning can also be carried out easily after casting of the artificial resin since the previously described friction drive for effecting the rotary motion can be used in an identical manner to clean the molds and if necessary the pipes at an appropriate place in the travel by means of scrapers, steel brushes or spray apparatus.

The principle of the invention can be carried out by various means of transportation. For instance, a track fitted with rollers, on which the frames and clamping devices can be set, may be chosen as a conveyor for pipes whose diameter is one-third or more of their length.

An embodiment of the invention is shown on the drawings, in which.

Figure 1:
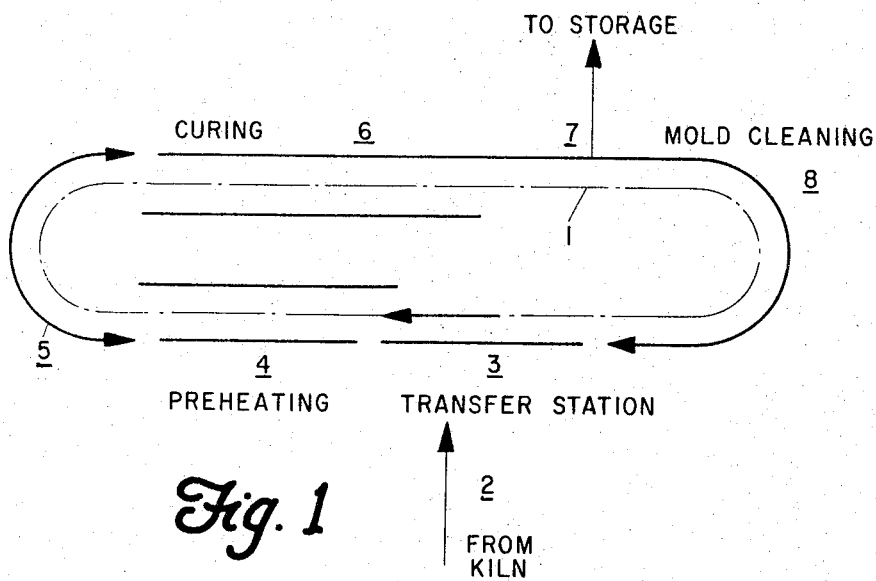
FIGURE 1 is a schematic view of the work process using apparatus in accordance with the invention.

In FIGURE 1 a closed loop transportation means, for instance a chain track, is shown by a broken line 1. The arrow at 2 represents a conveyor installation for the supply of the fired bell and spigot pipes to a transfer station 3 where the bell and spigot pipes are delivered to the conveyor system. At the same time the molds are applied to the spigot end and the bell end of the pipes.

The pipes fitted in this manner with the molds for the artificial resin packings are now carried along the track 1 into a zone 4 where a preheating takes place. The injection of the artificial resin into the molds at the bell and the spigot ends is carried out, preferably with the aid of injection nozzles or guns, in the zone near the reference number 5.

In an oven at the zone 6, the artificial resin is hardened or cured and at position 7 the pipes are finally discharged from the respective frames on the conveyor system and delivered to storage after being cleaned, if this is necessary.

The molds remaining on the conveyor system are cleaned at zone 8 on their return path to the transfer station 3, where they arrive perfectly clean preparatory to receiving at any given time new bell and spigot pipes respectively.

Figure 2:
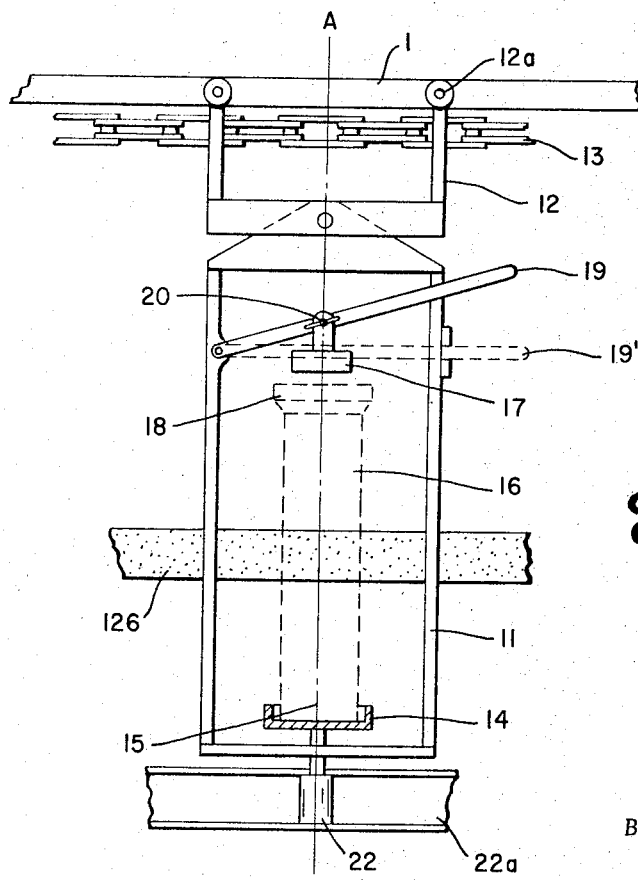
FIGURE 2 is a schematic view of the frame as it is employed in the apparatus in accordance with the invention.

A rectangular frame, preferably of tubular construction, is shown at 11 in FIGURE 2 and is attached to a track 1 by a suspension device 12, from which it hangs essentially in a perpendicular position. A chain conveyor 13 suitably engages the suspension device 12 for causing same to travel along the track 1, rollers 12a on the device 12 riding in the track 1.

A lower mold, into which the spigot end 15 of a pipe 16 is inserted, is shown at 14. Through appropriate suspension in a frame 11, which is not shown in detail, a mold 14 is able to rotate around axis A—A shown by a broken line. A counter mold for the bell end 18 of one pipe is shown at 17. The counter mold 17 is rotatable about its axis and pivots on a lever 19 by means of an intermediate pin 20. The lever 19 is pivoted at one end to the frame 11.

After insertion of the spigot end 15 into the mold 14, the lever 19 is rocked downward into the position shown at 19' whereby not only the counter mold 17 is inserted into the bell end 18, but also the pipe 16 is tightly clamped between molds 14 and 17. It is understood that until the pipe 16 is fastened between the two counter molds 14 and 17 it is held by a suitable transport device, for instance one with a suction head (not shown). The lever 19 can be secured in the position shown at 19' by means of a ratchet shown schematically at 21.

Figure 3:
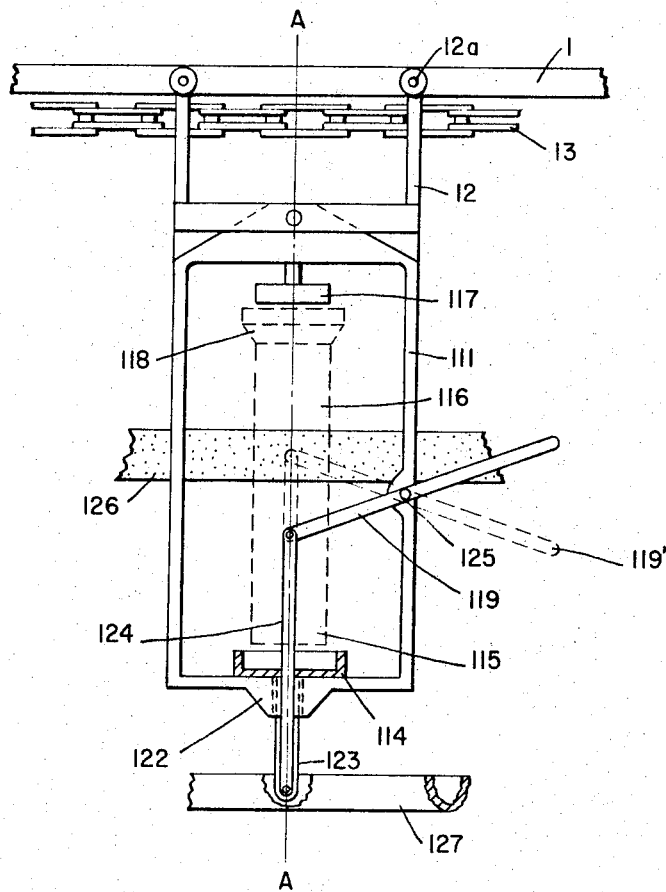
FIGURE 3 is a schematic view of another form of frame.
Figure 6:
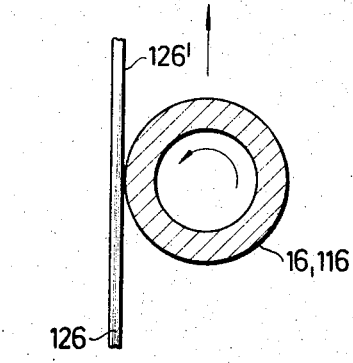
FIG. 6 is a horizontal section through, and about two-thirds of the way up the pipe 16 as shown in FIG. 2 so as to show the part 126.
Figure 5:
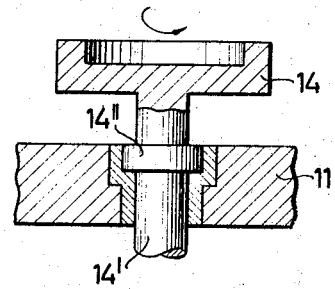
FIG. 5 is a partial section through the bottom mold 14 shown in FIG. 2.
Figure 4:
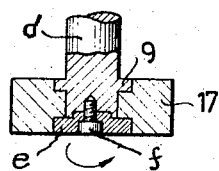
FIG. 4 is a partial section of the top mold shown in FIG. 2.

In the form shown on FIGURE 3, the rotatable upper counter mold 117, which enters the bell end 118 of the bell and spigot pipe 116, is fixed by a depending post in the frame 111. The rotatable lower counter mold 114, which embraces the spigot end 115, is movable by a rod 123, which is guided in a bushing 122. A link 124 is pivoted at one end to the rod 123 and at its opposite end to the end of a lever 119, which in this instance is pivoted at 125 somewhat lower down in the frame 111. The lever 119 can be rocked from the position shown by a solid line to the broken line position 119'. Any suitable means, such as friction, may be employed for retaining the lever 119 in one position or the other. By this means the bar 123 is lifted by the link 124 in order to clamp the bell and spigot pipe 116 from below between the two counter molds 114 and 117, which are operated as clamping devices.

Also in this construction care must be taken to enable the pipe 116 to be rotated about the axis A—A by frictional engagement with a laterally arranged rail 126 having a friction facing which bears against the pipe during advancing movement.

In the form shown in FIGURE 3, it is, for instance, possible to make the rod 123 serve as guiding element within a U-shaped guide 127 at the end of the frame remote from the track 1. In the construction according to FIGURE 2, for instance, a roller 22 or similar element can be provided at the lower end of the frame 11 to ride in a suitable guide rail 22a.

Depending on the choice of the various possible raw materials for the manufacturer of the packings, it is necessary to select the time intervals and thus the distances along the conveyor track necessary for the preheating, casting and curing cycles. There exist also materials for which the preheating and the curing cycles can be entirely eliminated. In this respect the drawing represents only one of a variety of possible forms of construction, with regard to the subdivision of the conveyor circuit.

What I claim is:

1. Apparatus for applying plastic packings to pipes of the bell and spigot end type in which the pipes are conveyed successively past stations where the plastic material is applied and where curing and hardening of the material is effected, the improvement which comprises a frame suspended from a conveyor member, axially spaced, movable mold members mounted on said frame for movement against opposite ends of said pipe when said pipe is placed therein, and means projecting from said frame to allow for free operation and movement of said mold members exteriorly of said frame when said pipe is in place therein, whereby said pipe when placed between said mold members is held therebetween preparatory to the reception of plastic packing material.

2. Apparatus as claimed in claim 1 comprising means for mounting each mold in the frame for rotary movement so that a pipe carried thereby is rotatable about its longitudinal axis, and means to cause rotation of the pipe and the molds carrying it during the traveling movement of the frame.

3. Apparatus as claimed in claim 1 comprising means for suspending the frame from one end during its advancing movement, and guiding means for the opposite end of said frame.

4. Apparatus as claimed in claim 1 comprising lever means for movement of said mold members.

References Cited

UNITED STATES PATENTS

| | | | |
|---|---|---|---|
| 2,779,056 | 1/1957 | Ligon | 18—26 XR |
| 2,857,622 | 10/1958 | Cleverly | 18—26 |
| 3,141,193 | 7/1964 | Slemmons | 18—4 XR |

WILLIAM J. STEPHENSON, *Primary Examiner.*